United States Patent [19]
Rudolphy

[11] 4,116,910
[45] Sep. 26, 1978

[54] PRINTING INK BINDERS

[75] Inventor: Albert Rudolphy, Wiesbaden, Germany

[73] Assignee: Hoechst Aktiengesellschaft, Frankfurt, Germany

[21] Appl. No.: 750,134

[22] Filed: Dec. 13, 1976

[30] Foreign Application Priority Data

Dec. 13, 1975 [DE] Fed. Rep. of Germany ....... 2556183

[51] Int. Cl.² .......................... C08K 3/08; C08K 3/10
[52] U.S. Cl. .................. 260/25; 260/33.6 R
[58] Field of Search ................ 260/25, DIG. 38, 33.6; 106/30

[56] References Cited

U.S. PATENT DOCUMENTS

| | | | |
|---|---|---|---|
| 3,674,732 | 7/1972 | Pitzalis et al. | 260/25 |
| 3,880,788 | 4/1975 | Rudolphy | 260/25 |

Primary Examiner—V. P. Hoke

Attorney, Agent, or Firm—Littlepage, Quaintance, Murphy, Richardson and Webner

[57] ABSTRACT

A printing ink binder comprising a reaction product of
I a natural resin,
II
  (a) a phenol-formaldehyde resol,
  (b) the components of II(a),
  (c) a combination of II(a) and II(b) and
III a compound of a metal of Group II of the Periodic Table according to Mendelejev, which reaction product has a viscosity of from 40 to 600 cP (50% toluene/20° C), a content of phenol units of from 0.3 to 25% by weight based on the weight of component I, a total amount of at least two metals of from 3 to 12% by weight based on component I, at least 60% by weight of the metal of the salt groups of the reaction product being calcium and at least 5% by weight being at least one metal selected from the group consisting of magnesium and zinc, and the total amount of formaldehyde used is between 0.9 and 4 mol/mol phenol and a composition comprising said binder.

9 Claims, No Drawings

PRINTING INK BINDERS

This invention relates to novel printing ink binders possessing utility in the production of inks for gravure printing.

The partial neutralisation of natural resin acids by compounds of second group elements of the Periodic Table according to Mendeleev is known and has the purpose of converting cheap natural resin acids having a low melting point and a high acid number into the harder form of resinates having a lower acid number. These resinates are, however, used solely as additive or extender resins for printing inks, enamel binders, adhesives or the like, since owing to their relatively slow drying and unsatisfactory adhesion to supercalendered paper they are not suitable as sole binders for rotogravure inks.

It is also known to convert dimeric resin acids into resinates. These have substantially higher melting points and lower acid numbers but higher viscosities than the corresponding resinates from monomeric natural resin acids and are therefore more suitable as sole binders for rotogravure inks. Moreover, they have very little tendency to crystallise during production and considerably fewer degradation products occur. However, dimerisation is slow and complicated, and also entails a substantial weight loss.

Surprisingly, we have now found that printing ink binders based on reaction products from natural resins with phenol-formaldehyde resols, and/or components thereof, and compounds of metals of the second group of the Periodic Table according to Mendeleev dry quickly and are even more suitable for gravure printing.

Thus according to one aspect of the present invention there is provided a printing ink binder comprising a reaction product of
(I) a natural resin,
(II) a phenol-formaldehyde resol and/or the components thereof and,
(III) a compound of a metal of Group II of the Periodic Table according to Mendeleev,
which reaction product has a viscosity of from 40 to 600 cP (50% toluene/20° C), a content of phenol units of from 0.3 to 25% by weight based on the weight of component I, a total amount of at least two metals of from 3 to 12% by weight based on component I, at least 60% by weight of the metal of the salt groups of the reaction product being calcium and at least 5% by weight consisting by magnesium and/or zinc, and the total amount of formaldehyde used is between 0.9 and 4 mol/mol phenol.

In the binders according to the invention the total amount of metal in the reaction product is preferably not more than 7%, and advantageously between 5 and 7%, by weight based on the weight of component I. The content of phenol units in the reaction product is preferably from 3 to 10% by weight. Higher proportions of phenol units may also, if desired, be used and in this case at least 10% by weight of phenol units are present.

Although the reaction products have a relatively low viscosity, they have a higher melting point and viscosity than the natural resin starting materials. Surprisingly, despite their relatively low viscosity, they not only dry just as rapidly as the known calcium resinates from dimeric natural resin acids but moreover they have an improved shelf life and give better defined print with higher gloss and colour density, particularly when combined with red or blue pigments.

These properties make it extremely advantageous to use the products according to the invention as printing ink binders, including sole binders, particularly for gravure printing on engraved cylinders.

Suitable natural resins include, for example, balsam colophony, root rosin, tall oil rosin or a mixture of two or more thereof.

Suitable components for (II) include for example, mono- or polyfunctional, mono- or polynucleic phenols and/or the alkyl substitution products thereof having 1 to 9 carbon atoms in the alkyl radical, such as phenol, resorcinol, diphenylolpropane, preferably alkyl phenols, such as cresol, butyl phenols, amyl phenols, octyl phenols, nonyl phenols, or mixtures thereof. The formaldehyde may be present as such, or in the form of paraformaldehyde or trioxan, or a mixture thereof. In the case of higher proportions of phenol, e.g. at least 10%, the formaldehyde will generally be present in substantially equimolar quantities with respect to phenol.

The use according to the invention of specific quantities of the phenol portion of the phenolic component (II) has the advantage that the resin has a higher degree of cross-linking, compared with the starting resin (I), owing to a greater proportion of functional groups, but this degree of cross linking is not so high that an undesirable increase in viscosity occurs. By matching the phenol proportion and metal content to each other and suitably selecting the phenolic component — and thus its reactivity — the products obtained according to the invention can be made to lie within a range of viscosities which makes optimum processing possible, particularly when used as a printing ink binder. Thus, with a constant metal content, high viscosity may be obtained by increasing the phenol proportion, for example, and similarly the viscosity can be controlled, whilst keeping the phenol content constant, by increasing the proportion of and suitably selecting the metal compounds. In many cases, it is advisable not to raise the metal content above 7% by weight, based on the natural resin, if there is a phenol content of at least 10% by weight.

The metal components III are preferably used in the form of their oxides, hydroxides or acetates or mixtures thereof.

The use of a mixture of metal compounds with at least 60% calcium content, ensures favourable behaviour of the product when combined with pigments, as would be necessary if the products were used as printing ink binders. Indeed it has been shown that it is this high calcium content that gives the pigmented printing inks a particularly good shelf life, particularly when they are pigmented with yellow pigments.

The reaction products from the components (I) to (III) may be prepared with or without solvents. Solvents which may be used for this purpose are for example, toluene, xylene and/or petrol.

The products prepared according to the invention gnerally have melting points of at least 110° C (determined by the capillary method) and viscosities of from 40 to 600 cP (50% toluene/20°). They are soluble in aromatic solvents in any proportion, and can be processed to form binders for toluene gravure printing. Relatively highly viscous reaction products according to the invention generally have a viscosity of from 250 to 600, preferably 250 to 400 cP (50% toluene/20°). Products with an increased viscosity of this order may be advantageous if printing inks are being printed on etched cylinders. Low to medium viscosity reaction products generally having a viscosity of from 40 to 250, preferably 50 to 150 cP (50% toluene/20°), are also very readily soluble in petrol boiling in the range from 80° to 110° C with 5% added toluene, which means that binders can be prepared both for petrol gravure printing and also for mixed gravure printing, i.e. with mixtures of solvents e.g. toluene and petrol. This is particularly important if the products are used as printing ink binders in countries wherein printing inks using only aromatic solvents are not permitted.

Since inks containing light petroleum generally dry more rapidly than inks in toluene alone, the invention makes it possible to extend the binders with a substantial proportion of synthetic resins which do not normally have any favourable printing properties themselves owing to their high solvent reaction, and nevertheless obtain fast drying printing inks with good gloss and a good adhesion to paper.

According to one embodiment of the invention, the reaction product may accordingly be present in admixture with a proportion of not more than 50, preferably 20 to 35% by weight, based on the total solids content of the resins, of a hydrocarbon resin.

Suitable hydrocarbon resins include, for example, those based on vinyl monomers, such as styrene, methyl styrene, vinyl toluene, mono- and/or diolefins with 4 to 5 carbon atoms, aromatic substances such as indene, and also cyclopentadiene or the dimerisation or substitution products thereof. Those containing the cyclic dienes just mentioned, generally in a major amount, are preferred.

The additional hydrocarbon resins may be produced from petroleum fractions, e.g. from so called "$C_5$ to $C_9$ fractions" or by polymerising artificial mixtures, whilst it is also possible to prepare them by thermal, ionic or radical polymerisation, e.g. by means of Friedel-Crafts catalysts.

Since the products according to the invention have high gloss and high colour density in addition to other favourable properties for use in printing, they are particularly suitable for printing on engraved cylinders, for which substantially higher requirements have to be met with regard to flow properties, gloss and colour intensity than when the hitherto conventional etched cylinders are used.

It is also possible to mix the printing ink binders according to the invention with other resins suitable for printing ink binders, e.g. those based on natural resins which have optionally been partially esterified and/or modified with maleic acid or the anhydride thereof and/or phenolic resins or phenols, or with hydrocarbon resins which are optionally modified with maleic acid or the anhydride thereof and/or phenolic resins or phenols.

In the following Examples, binders A to K are used which are prepared as follows. T represents parts by weight and the percentages are by weight, unless otherwise stated. Unless otherwise stated, the viscosities were determined in a 50% toluene solution at 20° C.

EXAMPLE A 14.5T of calcium acetate, 43T of calcium oxide, 11T of zinc oxide and finally 70T of phenol are added one after the other at 150° C and 50T of paraformaldehyde are added at 135° C to 1000T of molten Portuguese balsam colophony. In 2 hours, the mixture is heated to 250° C and kept at this temperature for 4 hours. The volatile portions are finally removed under reduced pressure. 1030T of resin are obtained; melting point 135° C, acid number 63, viscosity 90cP [50% toluene/capillary method (according to Ubbelohde)].

EXAMPLE B

The process of Example A is repeated except that 60T of calcium oxide are used instead of 43T of calcium oxide and 40T of paraformaldehyde are used instead of 50T of paraformaldehyde. 1037T of resin are obtained; melting point 139° C, acid number 48, viscosity 247cP.

EXAMPLE C

The process of Example A is repeated except that 57T of calcium hydroxide are used instead of calcium oxide, 34T of calcium acetate are used instead of 14.5T of calcium acetate and 40T of paraformaldehyde are used instead of 50T of paraformaldehyde. 1025T of resin are obtained, melting point 138° C, acid number 50, viscosity 104cP (40% in toluene).

EXAMPLE D 1000T of Chinese balsam colophony and 1000T of tall oil rosin are reacted at 140° C with 280T of a phenolformaldehyde condensate condensed under alkaline conditions (molar ratio of formaldehyde : phenol = 1.4 : 1; dry residue 1h/135° C = 67%). The reaction product is then reacted with 28T of calcium oxide, 28T of magnesium oxide and 30T of calcium acetate as in Example A. 2122T of resin are obtained; melting point 133° C, acid number 65, viscosity 80.5cP.

EXAMPLE E

The process of Example D is repeated except that 2000T of root rosin are reacted with 104T of the phenolformaldehyde condensate and then with 96T of calcium oxide, 68T of calcium acetate and 22T of zinc oxide. 2095T of resin are obtained; melting point 145° C, acid number 55, viscosity 62cP.

EXAMPLE F 2000T of Portuguese colophony are reacted at 140° C with 30T of tert.-butylphenol and 140T of the same phenol resol as in Example D, then with 96T of calcium oxide, 45T of calcium acetate and 11T of magnesium oxide. 2137T of resin are obtained; melting point 140° C, acid number 40, viscosity 92cP.

EXAMPLE G

The process as in Example F is repeated except that 20T of diphenylolpropane are used instead of 30T of p-tert-butylphenol. 2130T of resin are obtained, melting point 138° C, acid number 40, viscosity 123cP.

EXAMPLE H 140T of phenol and 2000T of Portuguese colophony are melted and condensed by refluxing for 3 hours at a temperature of 110° C with 50T of paraformaldehyde and 50T of 25% ammonia. After the reflux condenser has been removed, the mixture is heated to 160° C, 116T of calcium oxide and 10T of magnesium oxide are added and when 250° C is reached 20T of calcium acetate are added and the mixture kept at 250° C for a further 4 hours. 2137T of resin are obtained; melting point 117° C, acid number 31, viscosity 400cP.

EXAMPLE I 1500T of Portuguese colophony and 500T of tall oil rosin are reacted at 140° C with 180T of the same phenol resol as in Example D and then at 180° C with 70T of calcium oxide, 20T of magnesium oxide and 50T of calcium acetate. After 4 hours treatment at 250° C, 20T of hexamethylenetetramine are gradually added. The mixture is left to react at this temperature for a further 30 minutes. 2121T of resin are obtained: melting point 137° C, acid number 56, viscosity 175cP.

EXAMPLE K 2100T of Portuguese colophony are condensed by refluxing for 3 hours with 100T of phenol, 20T of diphenylolpropane, 50T of paraformaldehyde and 50T of 25% ammonia. 96T of calcium oxide, 70T of calcium acetate and 10T of magnesium oxide are then added to the mixture and it is further reacted as in Example F. 2151T of resin are obtained; melting point 133° C, acid number 27, viscosity 380cP.

COMPARISON EXAMPLE L 2000T of standard commercial dimerised colophony are melted. At 190° C, 10T of calcium acetate and 120T of calcium hydroxide are reacted at increasing temperature. After 5 hours treatment at 250° - 260° C, 2000T of resin are obtained; melting point 155° C, acid number 51, viscosity 320cP.

COMPARISON EXAMPLE M

A resin prepared from dimerised colophony is used as comparison sample. Melting point 148° C, acid number 53, viscosity 240cP.

PREPARATION OF PRINTING INKS

50% toluene solutions of binders A to K and comparison binders L and M were prepared and the flow time of these solutions was determined at 20° C in a 4mm DIN cup. The flow time of these solutions was then adjusted to 17 seconds by adding further toluene. Depending on the type of printing ink desired, a suitable pigment was dispersed in these solutions in a glass ball mill for 15 minutes at 1500 rpm. Pigmentation, for the preparation of blue inks, was effected with 12% by weight, based on the weight of the binder, of Hostaperm Blue B3G (Hoechst), for the preparation of yellow ink with 13% by weight of Permanent Yellow DHG 23 (Hoechst) and for red ink with 20% by weight of Permanent Ruby L6B (Hoechst).

The flow time of the inks was then re-adjusted to 17 seconds in the 4mm DIN cup by adding further toluene, and to determine the shelf life of the printing inks the flow times were each tested again after 1 and 12 days storage.

Technical printing tests

To determine the drying time, first a wet film layer of ink 36μ thick is applied to coated paper using a coil of wire. The time taken, in seconds, until there is no adhesion is determined by pressing with the edge of the hand.

The gloss according to Lange was measured after the printing ink had been applied to coated paper and stored for one day. The residue of the inks was determined by weighing 4g of ink on a sheet metal lid which was heated to 150° C for 30 minutes whilst passing air over it.

Test results

In the following Table, the test results are assembled separately according to the inks.

Table 1

| Sample | Blue Ink | | | | | | | | | | | |
|---|---|---|---|---|---|---|---|---|---|---|---|---|
| | A | B | C | D | E | F | G | H | I | K | L | M |
| | | | | | | | | | | | comparison | |
| Residue % | 50 | 47 | 50.2 | 50.1 | 52 | 50 | 49 | 46 | 48.5 | 46.5 | 44 | 45 |
| Drying time (s) | 46 | 42 | 42 | 46 | 43 | 45 | 47 | 41 | 43 | 40 | 44 | 46 |
| Gloss (acc. to Lange) % | 90 | 87 | 92 | 94 | 98 | 93 | 88 | 85 | 90 | 86 | 74 | 78 |
| Flow time (s): after 1 day's storage | 17 | 16.9 | 17.1 | 17 | 16.8 | 17.1 | 17 | 17 | 17.1 | 16.9 | 16.8 | 16.9 |
| after 12 day's storge | 19 | 19.5 | 20.2 | 20 | 19.8 | 20 | 21 | 18.5 | 19 | 19.4 | 36 | 33 |
| increase % | 11.5 | 15.1 | 19 | 17.5 | 18 | 19 | 19 | 9 | 11 | 14.5 | 114 | 95 |

| Sample | Yellow Ink | | | | Red Ink | | | | |
|---|---|---|---|---|---|---|---|---|---|
| | A | K | L | M | C | E | I | L | M |
| | | | (comparison) | | | | | (comparison) | |
| Residue % | 48 | 44.5 | 42 | 43 | 52 | 53 | 50 | 72 | 74 |
| Drying time (s) | 50 | 46 | 49 | 51 | 38 | 41 | 39 | 38 | 40 |
| Gloss (acc. to Lange) % | 82 | 78 | 68 | 70 | 85 | 92 | 87 | 46 | 47 |
| Flow time (s): after 1 day's storage | 17.2 | 17 | 16.9 | 17.1 | 16.8 | 17.1 | 17 | 17.1 | 16.9 |
| after 12 day's storage | 24 | 22 | 23 | 24 | 24 | 25 | 24 | 40 | 39 |
| increase % | 39 | 29 | 36 | 40 | 43 | 46 | 41 | 135 | 131 |

Discussion of the results

The inks prepared from the low viscosity Samples A, C to G and I, contrary to expectations, dry just as quickly, in all three types of ink, as the highly viscous comparison Samples L and M, and as do the highly viscous Samples B, H and K. The binders prepared according to the invention, including the highly viscous Samples B, H and K have substantially higher gloss than the comparison samples, in all three types of ink. The difference in shelf life, as indicated by the flow times, is even greater. The flow times of the comparison Samples L and M increased by 114 and 95% respectively in the blue ink and by 135 and 131% in the red whereas the highest increase in viscosity in the samples according to the invention was only 19% in the blue inks and a maximum of 46% in the red.

When used for printing in a gravure machine of the "Labra-tester" type, the transfer of ink from the printing plate onto the paper was distinctly less favourable in the comparison samples than the inks made from the binders according to the invention. The good printing properties obtained for the samples according to the invention are unusual for binders having a viscosity in the range of between 50 and 150cP which is preferred in practice.

The different drying times depending on the resin and solvent used are illustrated by means of the following series of tests with 50% solutions of the binders additionally containing blue pigments. The solvent mixtures used in each case consist of 60 to 85% by weight of petrol and 15 to 40% by weight of toluene.

A printing ink Sample A described hereinbefore, i.e. dissolved in pure toluene, is compared with other samples, of which Sample N contains the same binder as Sample A, but dissolved in a mixture of solvents.

Comparison Sample O represents the solution of a standard commercial thermally polymerised hydrocarbon resin (melting point 109° C, acid number 0, viscosity 30cP), containing a substantial amount of cyclopentadiene, in the mixture of solvents.

Sample P contains as resin component a mixture of the resin according to A and the hydrocarbon resin of comparison Sample O in a weight ratio of 1 : 1, dissolved in the mixture of solvents.

Sample Q contains as resin component a mixture of the same resins as in Sample P, but in the ratio 2 : 1, dissolved in the mixture of solvents.

The technical printing qualities are tested as above. The test results are shown in the following table:

Table 2

| Sample | A | N | O (comparison) | P | Q |
|---|---|---|---|---|---|
| Residue | 50 | 49.7 | 54 | 52 | 50.8 |
| Drying time (s) | 46 | 22 | 110 | 50 | 35 |
| Gloss (according to Lange) % | 90 | 80 | 100 | 90 | 88 |

Discussion of the results

Table 2 shows that Sample N in the mixture of toluene and petrol requires only half the drying time, i.e. dries twice as fast as Sample A in pure toluene. On the other hand, comparison Sample O consisting of the hydrocarbon resin in the toluene-petrol mixture takes 5 times as long to dry as Sample N.

However, if mixtures of the resin of Sample A with the hydrocarbon resin of Sample O in a toluene-petrol mixture are used as starting materials i.e. Sample P, with a 50% mixture, drying is just as quick as in Sample 1. In the case of a mixing ratio of 2 : 1 i.e. sample Q the drying time is less than that of sample A, i.e. a substantial increase in speed of drying is obtained.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A printing ink binder comprising a reaction product of
   (I) a natural resin,
   (IIa) a phenol-formaldehyde resol, or
   (b) the components of IIa), or
   (c) a combination of IIa) and IIb) and
   (III) a compound of a metal of Group II of the Periodic Table according to Mendelejev, which reaction product has a viscosity of from 40 to 600 cP (50% toluene/20° C), a content of phenol units of from 0.3 to 25% by weight based on the weight of component I, a total amount of at least two metals of from 3 to 12% by weight based on component I, at least 60% by weight of the metal of the salt groups of the reaction product being calcium and at least 5% by weight being at least one metal selected from the group consisting of magnesium and zinc, and the total amount of formaldehyde used is between 0.9 and 4 mol/mol phenol.

2. A binder as claimed in claim 1 wherein the content of phenol units in the reaction product is from 3 to 10% by weight based on the weight of component I.

3. A binder as claimed in claim 1 wherein the content of phenol units is at least 10% by weight based on the weight of component I and the amount of formaldehyde is a substantially equimolar quantity with respect to phenol.

4. A binder as claimed in claim 1 wherein metal component III is selected from the group consisting of at least one oxide, hydroxide and acetate.

5. A binder as claimed in claim 1 wherein the reaction product has a melting point of at least 110° C as determined by the capillary method.

6. A binder as claimed in claim 1 which additionally comprises a hydrocarbon resin in an amount of not more than 50% by weight, referred to the total solids content of the resins.

7. A binder as claimed in claim 6 wherein the hydrocarbon resin is based on at least one monomer selected from the group consisting of $C_5$ to $C_9$ petroleum fractions and monomers containing cyclic dienes.

8. A binder as claimed in claim 1 which additionally comprises at least one resin selected from the group consisting of
   (a) a natural resin,
   (b) a resin (a) being partially esterified,
   (c) a resin (a) being modified with a maleic acid unit,
   (d) a resin (b) being modified with a maleic acid unit,
   (e) a phenolic resin
   (f) a phenol.

9. A printing ink composition comprising a binder as defined in claim 1 with a solvent selected from the group consisting of petrol alone and petrol in admixture with toluene.

* * * * *